May 28, 1957     A. HALTMEIER     2,793,756

FILTERING APPARATUS

Filed Feb. 5, 1952

INVENTOR.
ALFRED HALTMEIER
BY Burgess & Dinklage
ATTORNEYS 2,793,756

FILTERING APPARATUS

Alfred Haltmeier, Leverkusen-Bayerwerk, Germany, assignor to Farbenfabriken Bayer Aktiengesellschaft, Leverkusen, Germany, a corporation of Germany Application February 5, 1952, Serial No. 270,067

Claims priority, application Germany February 10, 1951

14 Claims. (Cl. 210—360)

The present invention relates to filtering apparatus.

The solid portions of liquids containing solids may be separated out in the form of mud or dust by filtering. For this purpose, there may be used porous diaphragms of membranes, such as filtering cloths, filter stones, filtering papers of layers of granular substances the pores of which permit passage of the carrying medium but retain the solids. A layer of solid particles is formed on the surface of the porous membrane; this layer is also porous and improves the filtering action but simultaneously decreases the rate of the flow through the filter until it finally reduces the permeability to such an extent that the filter must be cleaned. The solid particles on the filter are withdrawn by a back flow of water fed under pressure through the filter from below or, especially with dust filters, by beating the filter. This essential cleansing operation often leads to difficulties and to a costly consumption of filter cloth, since, in most cases, it is not easy completely to remove the solid particles retained in the pores.

In accordance with the invention, the difficulties in filtering operations previously encountered are substantially removed by means of filters the surface of which are provided with hair or bristles. The filtering action is not obtained by the passage of the medium to be filtered through the filter membrane, but by flowing it along the filter area so that the hair or bristles retain the solid particles in their interspaces. The means for filtering used according to the invention are impermeable or substantially impermeable. The thinner the individual hair or bristles and the closer they are arranged, the better the action of the velvet-like filter surface. The interspaces are clogged or choked in a fundamentally different way from the porous membranes used hitherto. The solids settling on the hair or bristles of the filter surface clog the interspaces first at the bottom and then progressively advance to the ends of the hair or bristles so that the velvet-like filter has a substantially higher load capacity than a filter of porous membranes. As compared with the membrane filter, the velvet-like filter can be more easily and conveniently cleansed after being clogged or choked. When using membrane filters, the solid particles are more or less tightly confined in the pores, but in the filter provided by the present invention the granules can be made comparatively rapidly to drop out of the spaces formed between the hair or bristles by turning the hairy surface downwardly and shaking it from above, for instance by tapping or beating.

In the filtering operation, the filter area provided with hair or bristles is preferably placed in an inclined position to offer a sloping surface to the liquid to be filtered. For continuous filtering, it is of advantage to use a conveyor belt having a filter surface provided with hair or bristles. The inclined position may be obtained by running the filtering belt from a lower to a higher roller. The hair or bristles may be attached to the endless belt, which may be of rubber, by means of strips into which the hair or bristles are inserted and which are arranged transversely, and preferably at right angles, to the direction of movement of the belt. Liquid can be prevented from running off the sides of the hairy surface of the belt by raised rims consisting, for instance, of a thin rubber layer, which wrinkles during motion of the belt. The granules or filter mud are preferably withdrawn from the spaces formed between the hair or bristles by means of a device vibrating or shaking the belt during its return run, for instance by tapping or beating the back of the belt.

Another useful embodiment of the invention comprises a circular disc provided with hair or bristles, the circular disc rotating about a vertical axis. The centrifugal force of such circular disc is utilized for flowing the liquid to be filtered through the hairy filter floor. Moreover, the force of gravity can be made use of, by inclining the disc downwardly toward the rim of the disc; in this case there is formed a hairy rotation area with downwardly inclined generatrices as filter surface. On the other hand, the disc may rise towards the rim; in this case, the centrifugal force serves to drive the filter liquid and a hairy rotation surface with upwardly directed generatrices is formed. The hair or bristles are preferably arranged in concentric rings around the vertical axis of the filtering surface. The filter mud may be removed from the hairy floor of the filter by means of a device which rotates the circular disc, clogged or choked with mud, preferably through 180°, so that the hairy floor is directed downwardly. After turning the filter surface downwardly, the filter mud is removed from the filter surface by means of vibration devices, for instance by tapping.

In the accompanying diagrammatic drawings which illustrate some preferred embodiments of the invention:

Figure 2 is a section through a belt forming part of the apparatus illustrated in Figure 1, Figures 3 and 4 are sectional elevations of two alternative filtering apparatus, while

Figure 1:
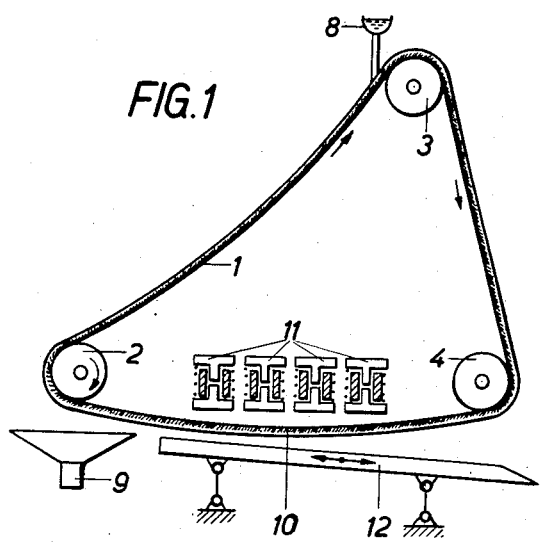
Figure 1 is a sectional elevation of a filtering apparatus.
Figure 2:
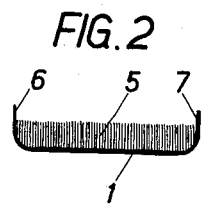

In the embodiment illustrated in Fig. 1 a conveyor belt is provided on one side with hair or bristles 5, and runs over rollers 2, 3 and 4; the belt is driven, for instance by roller 2. Rims 6, 7 are provided on each side of the belt and may consist of thin rubber layers which wrinkle on movement of the belt. The liquid to be filtered is supplied by means of a feed funnel 8 and runs downwardly through the hairy surface of the belt. The sediment is retained by the bristles but the liquid runs off the belt at the roller 2 into discharging funnel 9. The moving belt carrying the sediment runs slowly over the rollers 3 and 4 to the return run 10 during which the mud is withdrawn from the hairy surface of the filter by means of vibration devices 11, for instance electric hammers. The mud drops into a vibrating chute 12 from which it is finally discharged.

Figure 3:
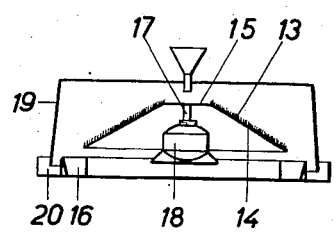

In the filtering apparatus illustrated in Fig. 3, bristles 13 are arranged on a conical surface 14. The liquid to be filtered is fed to a plate 15 and runs down the conical surface 14, the mud being retained by the filter surface 13. The liquid flows off at the lower edge of the conical surface 14 and is collected in a gutter 16. When the filter surface 13 is clogged, the conical surface 14 is rotated by means of the shaft 17, which is driven by the drive 18, to throw off the mud from the filter surface 13. The mud is collected in the casing 19 and runs down the walls of the casing into the gutter 20.

Figure 4:
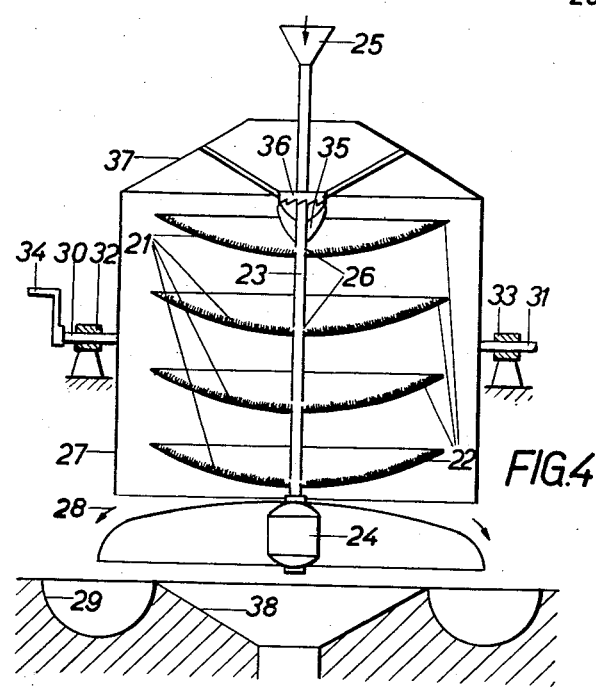
Figure 5:
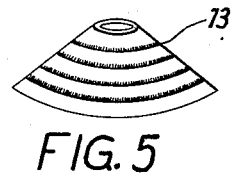
Fig. 5 is a perspective view of the filtering apparatus illustrated in Fig. 3 showing the arrangement of the filaments in concentric rings about the axis of the rotating disc.

The filtering apparatus illustrated in Fig. 4 comprises hairy filtering floors 21 on the inner surfaces of concave bodies 22 arranged on a hollow vertical shaft 23 which can be rotated by means of a drive motor 24. The liquid to be filtered is fed into the hollow shaft 23 through a funnel 25 at its top and is distributed on the concave filtering surfaces 22 through bores 26 in the shaft 23. The liquid runs outwardly along the concave surfaces on account of the centrifugal force, and therefore flows through the hairy floors 21. The liquid is flung off at the outer rims of the rotating bodies 22, collected in a casing 27 and conducted into a gutter 29 through an annular outlet slot 28. When the filtering surfaces 22 are choked with mud the driving motor 24 is switched off and the apparatus, which is pivoted on trunnions 30 and 31 in bearing boxes 32 and 33, is rotated through 180° by means of a crank 34. The mud may be removed from the inverted filtering surfaces 22 by slowly rotating the bodies 22 and shaking or vibrating them by means of cams 35 which run on a toothed disc 36. The mud is therefore knocked out and falls on a conical surface 37 of the casing 27 whence it falls into a discharge funnel 38. In the devices of Figures 3 and 4 the bristles 13 may be arranged in circles concentric with the rotating surfaces as shown in Figure 5 for example.

I claim:

1. Filtering apparatus, comprising means defining a substantially liquid impermeable surface provided with multiple, closely-spaced-apart substantially upright filaments, said surface being positioned to allow a liquid to flow thereover in a direction transverse to said filaments, and means for flowing a liquid along said surface in which said surface is a substantially inclined surface and in which said means for flowing a liquid along said surface is positioned for passing a liquid onto an upper portion of said surface.

2. Filtering apparatus according to claim 1 in which said surface is defined by a conveyor belt.

3. Filtering apparatus according to claim 2 in which said conveyor belt is an endless conveyor belt, rotatably mounted, having at least a portion thereof extending in an inclined position and including means for rotating said conveyor belt.

4. Filtering apparatus according to claim 3 in which said conveyor belt is positioned so that a portion thereof runs with said surface in a substantially inverted position.

5. Filtering apparatus according to claim 4 including means for vibrating said portion running with said surface in a substantially inverted position.

6. Filtering apparatus according to claim 5 in which the sides of said endless conveyor belt are provided with raised rims extending in the direction of said filaments.

7. Filtering apparatus according to claim 6 in which said means for flowing liquid along said surface is positioned for passing a liquid onto said surface at the upper end of said inclined portion.

8. Filtering apparatus according to claim 7 in which said filaments are strips of hair arranged transversely to the direction of travel of said belt.

9. Filtering apparatus according to claim 1 in which said surface is defined by a disc rotatable about a vertical axis and including means for rotating of said disc.

10. Filtering apparatus according to claim 9 in which said surface defined by said disc is a downwardly inclined surface.

11. Filtering apparatus according to claim 9 in which said filaments are hairs arranged in concentric rings around said vertical axis.

12. Filtering apparatus according to claim 1 in which said surface is defined by a dished disc rotatable about a vertical axis and including means for rotating said disc.

13. Filtering apparatus according to claim 12 in which said filaments are hair arranged in concentric rings around said vertical axis.

14. Filtering apparatus according to claim 12 including means for turning said disc upside down.

References Cited in the file of this patent

UNITED STATES PATENTS

| | | |
|---|---|---|
| 31,855 | Weiland | Mar. 26, 1861 |
| 399,984 | Gessl | Mar. 19, 1889 |
| 2,043,181 | Lamort | June 2, 1936 |
| 2,468,354 | Abbrecht | Apr. 26, 1949 |

FOREIGN PATENTS

| | | |
|---|---|---|
| 472 | Great Britain | 1864 |
| 2,331 | Great Britain | 1866 |
| 542,560 | Great Britain | Jan. 15, 1942 |
| 632,360 | Great Britain | Nov. 28, 1949 |